United States Patent

Wright

[15] 3,643,863
[45] Feb. 22, 1972

[54] COMBINATION CONTROL DEVICE HAVING A HYDRAULIC HIGH LIMIT VALVE ASSEMBLY

[72] Inventor: John W. Wright, Long Beach, Calif.

[73] Assignee: Robertshaw Controls Company, Richmond, Va.

[22] Filed: Feb. 13, 1970

[21] Appl. No.: 11,078

[52] U.S. Cl. .................................. 236/80, 236/81, 236/92
[51] Int. Cl. ........................................................ G05d 16/16
[58] Field of Search .......................................... 236/1 H, 9, 80

[56] References Cited

UNITED STATES PATENTS

| | | | |
|---|---|---|---|
| 2,244,555 | 6/1941 | Harris | 236/9 X |
| 2,262,825 | 11/1941 | Welliver | 236/9 |
| 2,387,792 | 10/1945 | Holmes | 236/48 |
| 2,572,675 | 10/1951 | Swenson | 236/9 UX |
| 2,837,287 | 6/1958 | Miller et al. | 236/99 |
| 3,433,409 | 3/1969 | Jackson et al. | 236/9 |

Primary Examiner—Edward J. Michael
Attorney—Auzville Jackson, Jr., Robert L. Marben and Anthony A. O'Brien

[57] ABSTRACT

A combination control device for main and pilot burner apparatus having a differential pressure operated diaphragm valve operated by an internal bleed line which is subject to pressure regulation, thermostatic on-off control, and high-temperature shutoff regulation. The pressure regulation, thermostatic on-off control, and high-temperature regulation features are independently provided by individual valve assemblies so as to increase the overall fail-safe characteristics of the combined device, the high-temperature valve assembly including a hydraulic snap acting mechanism actuated by a closed hydraulic system charged with a gas vapor having a vapor pressure which is less than atmospheric pressure for enabling rapid fuel flow cutoff upon the occurrence of a preselected excessive ambient temperature and for assuring fuel cutoff in the event of a rupture of the hydraulic system.

13 Claims, 3 Drawing Figures

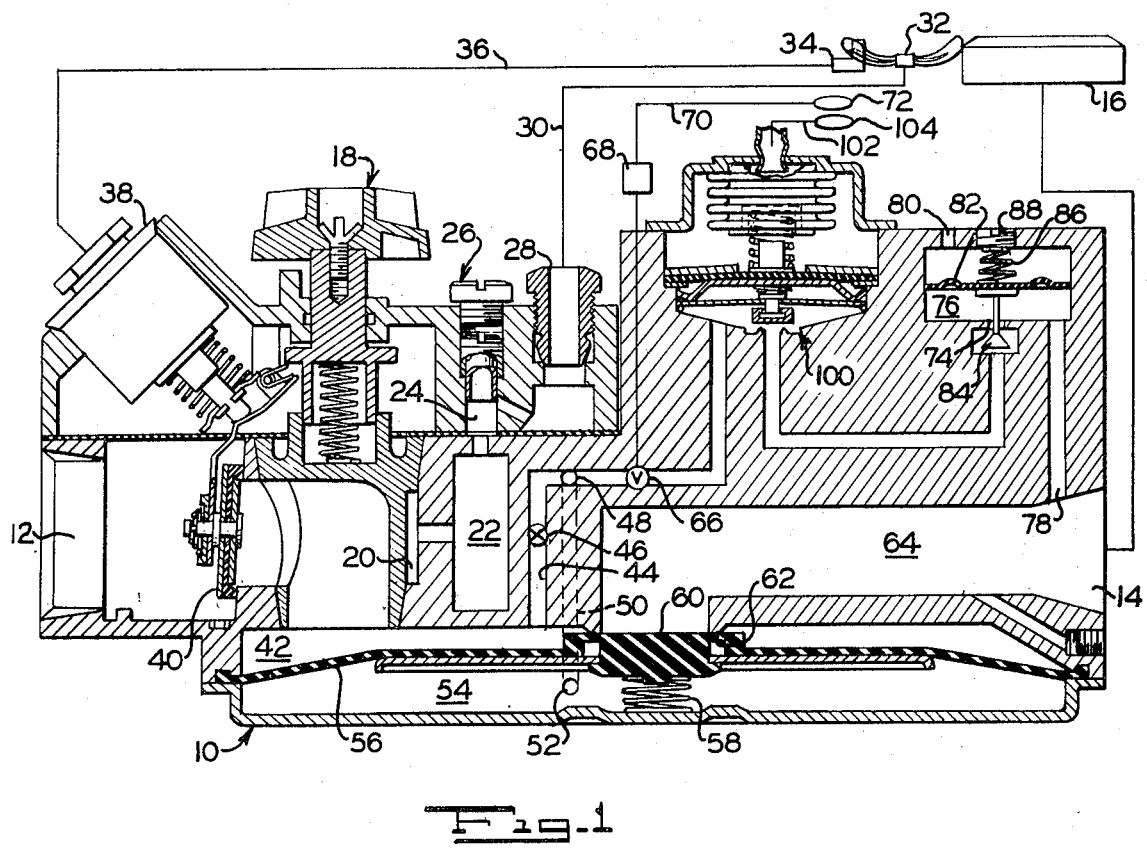

3,643,863

COMBINATION CONTROL DEVICE HAVING A HYDRAULIC HIGH-LIMIT VALVE ASSEMBLY

BACKGROUND OF THE INVENTION

1. Field of the Invention

The present invention relates to flow control systems, and in particular, to such a system having diaphragm operated thermostatic on-off control of gas flow to a fuel burner, regulation of the gas pressure to the burner, as well as an independently operated hydraulic high temperature safety valve for shutting off a fuel flow in the event of excessively high ambient temperatures.

2. Description of the Prior Art

The prior art, as exemplified by U.S. Pat. No. 3,227,370, No. 3,235,180 and No. 3,260,459, is cognizant of the general arrangement of a combination control having a differential pressure-operated diaphragm valve for main flow control and regulation with an internal bleed line for operating the diaphragm valve in response to a thermostatic on-off control and a pressure regulator. The multiplicity of operating components utilized with such combination control devices often complicate their operation and inherently necessitate increased fail-safe provisions to preclude raw fuel leakage in the event of a malfunction of any of the various individual control subassemblies.

While many of the prior art combination control devices have proven satisfactory under normal conditions of operation, the various fail-safe devices utilized therein are often not conveniently located or easily available to the mechanic or repairman. In addition, such devices are often integrally formed with various individual control assemblies in the combination device and for this reason are typically complicated and expensive to repair. Thus, while the need for an independent recycling high-limit fail-safe valve assembly has long been recognized, a simple yet reliable high-temperature control device has heretofore been unavailable.

SUMMARY OF THE INVENTION

The present invention is summarized as including a casing having an inlet and an outlet passage, a differential pressure operated diaphragm valve mounted in the casing between the inlet and outlet passage and operatively movable between on-off positions and regulating positions, and a bleed line in the casing controlling an operating pressure on the diaphragm valve; mounted in the bleed line is a first on-off valve movable between on and off positions for controlling the operating pressure on the diaphragm valve, a thermostatic device operatively connected to the first on-off valve for actuating the same in response to ambient temperature variations, a pressure-regulating valve for regulating the operating pressure on the diaphragm valve to modulate the same, a second on-off valve movable between on and off positions for independently controlling the operating pressure on the diaphragm valve, and a hydraulically operated device operatively connected to the second on-off valve for actuating the same in response to a predetermined excessive ambient temperature whereby the diaphragm valve is moved to an off position in response to excessively high ambient temperatures independently of the first on-off valve and the pressure regulating valve.

It is an object of this invention to construct a combination control device having increased high-temperature fail-safe characteristics.

The present invention has another object in that an independent valve arrangement controls a bleed flow to affect closure of a main diaphragm valve in a unitary control device in response to excessive ambient temperatures.

A further object of the present invention is to construct a combination control device including a separate high temperature bleed line control valve assembly for providing improved fail-safe operation.

The present invention has a further object in that a high-temperature valve assembly for a unitary control device is recycling and is fail-safe.

A further object of this invention is to construct a hydraulic high temperature valve utilizing a gas-charged thermally expansible closed actuating system employing gas vapor having a vapor pressure which is less than atmospheric pressure for increased failure condition safety.

Another object of this invention is to construct a hydraulic high limit valve assembly to provide snap-acting closure at a preselected temperature in response to an increase in ambient temperature and snap acting opening at a different temperature in response to a decrease in sensed ambient temperature from the preselected temperature.

The present invention is advantageous over conventional control devices in the provision of increased fuel control safety, reduced construction and maintenance costs, and improved snap-acting cyclic operation.

Further objects and advantages of the present invention will become more fully apparent from the following description of the preferred embodiment when taken in conjunction with the accompanying drawing.

BRIEF DESCRIPTION OF THE DRAWING

FIG. 1 is a schematic diagram of a combination control device embodying the hydraulic high limit valve assembly of the present invention;

FIG. 2 is a partial section of a detail of the high-limit valve assembly of the present invention shown schematically in FIG. 1; and FIG. 3 is a partial section similar to FIG. 2 but showing the components in another operating position.

DESCRIPTION OF THE PREFERRED EMBODIMENT

As illustrated in FIG. 1, the present invention is embodied in a flow control device, indicated generally at 10, having an inlet 12 adapted to be connected to a source of gaseous fuel (not shown) and an outlet 14 connected to feed a fuel burner such as the main burner 16 of a heating system. The control device 10 includes a manually rotatable shutoff cock 18 having an "off" position, a "pilot" position and an "on" position. In the "pilot" position, fuel from the inlet 12 flows through a pilot port 20 in the rotatable plug 18 to a pilot filter cavity 22 which communicates with a pilot flow passage 24. The fuel flowing through the pilot flow passage 24 is controlled by a pilot flow valve, indicated generally as 26, which sets the desired pilot flow rate through coupling assembly 28 and thence externally of the control device 10 through a pilot flow conduit 30 to a pilot burner 32. A thermoelectric generator 34 positioned adjacent the pilot burner 32 is electrically connected by a lead cable 36 to an electromagnetic holding device 38 of any suitable type which holds a safety pilot valve 40 open as long as there is a flame existing at the pilot burner 32 and which may include a manual reset means. Electromagnetic holding devices of this type are well known in the art, and a detailed description thereof is excluded for the sake of brevity.

In its "on" position, the rotatable plug valve 18 continues the flow of pilot fuel and, in addition, permits a main fuel flow from inlet 12 to a main valve chamber 42 from which bleed line fuel flows through a bleed passage 44. The bleed flow passage 44 is provided with a flow restrictor 46, downstream of which is located a two-way port 48 which communicates with a passageway 50 having a second two-way port 52 at its lower end. Port 52 opens into a main pressure chamber 54 defined by a lower wall of the casing of the control device 10 and a flexible diaphragm 56. A coil spring 58 in the chamber 54 is mounted in compression between the lower wall of the casing and a backup plate centrally fixed to the undersurface of the diaphragm 56. A main valve member 60 is formed upon the upper surface of diaphragm 56 and cooperates with a valve seat 62 formed in the main casing of the control device 10 for regulating main fuel flow from inlet 12 through the rotatable plug valve 18, main valve chamber 42 and an outlet passage 64 to the control device outlet 14.

Referring once again to bleed passage 44, a thermostatically operated valve 66 is located downstream of two-way port 48 for controlling bleed line fuel flow. The valve 66 is moved between a plurality of controlling positions by a thermally responsive operator 68 which may be of any suitable type such as a bellows (not shown) that communicates with a capillary tube 70 having a thermally responsive bulb 72 on its other end. The bellows in the operator 68, the capillary tube 70 and the thermal sensing bulb 72 form a closed system filled with a thermally expansible fluid so that a variation of temperature sensed by the bulb 72 produces a corresponding expansion and contraction of the bellows. The bulb 72 is located in a space being heated by the burner 16, and the operator 68 may include a snap-acting mechanism (not shown) for operating the valve 66 between on and off positions as determined by any suitable form of temperature setting means (not shown).

Downstream of the thermostatically operated valve 66, the bleed passage terminates in a valve seat 74 leading to a pressure regulating chamber 76 which in turn communicates with a bleed flow outlet 78 leading to the main flow outlet passage 14. An atmospheric vent passage 80 vents the space above a pressure-regulating diaphragm 82 the undersurface of which responds to the pressure of the bleed flow in the chamber 76. A pressure-regulating valve 84 is carried by the flexible diaphragm 82. The upper surface of the diaphragm 82 is biased by a coil spring 86 mounted in compression between the diaphragm 82 and an adjustable plug 88 threaded into a suitable opening in the casing of the control device 10.

Mounted in the bleed passage 44 between the thermostatically operated valve 66 and the pressure regulating valve 84 is a high limit thermally responsive valve assembly, indicated generally at 100 and constructed in accordance with the present invention. The high limit valve assembly 100 communicates with a capillary tube 102 having a thermally responsive bulb 104 on its other end; bulb 104 is located in the space being heated by the burner 16 so as to sense ambient temperature variations for accordingly controlling the operative position of the valve assembly 100.

Referring to FIGS. 2 and 3, which illustrate the details of the high limit valve assembly 100 of FIG. 1, the capillary tube 102 is fixedly attached, as by staking, into a central aperture formed in an upper housing member 106 which is mounted onto the control device casing by any suitable means such as screws. An expandable bellows 108 has an upper end sealably engaging the undersurface of the upper housing member 106 as well as the open end of capillary tube 102 so as to form an airtight closed system with the capillary tube and the thermally responsive bulb 104. The lower end of the bellows 108 is formed into a cylindrical axially aligned downwardly directed recess 110 for supportably maintaining a coil spring member 112 in compression between the bellows and a generally cylindrical thrust button 114. The thrust button 114 is mounted in nesting fashion within the lower portion of coil spring 112 and has an annular flange 116 formed upon its lower end for engaging the spring member 112. Coil spring 112 biases the thrust button 114 against a diaphragm 118 which is sealably mounted within the casing at its periphery between an annular ring member 120, which is located against an upwardly facing shoulder 122 in an interior sidewall of the casing of the device, and a flat retaining disc 124 which is maintained against the upper surface of the diaphragm 118 by any suitable mounting technique, such as by threads or by press fitting as illustrated. The diaphragm 118 cooperates with the interior surface of the casing to define an airtight valve chamber 125 which precludes raw fuel leakage from bleed line 44 (FIG. 1).

The retaining disc 124 defines a centrally aligned hole therethrough for permitting axial movement of the thrust button 114 so as to transmit the motion of bellows 108 to a plunger member 126 which has a generally flat central portion extending to a frustoconical circumferential rim 128 which includes an annular operating edge 130 at its lower, outer edge. A second frustoconical rim 132 is contiguous with rim 128 and extends from the operating edge 130 to an interior vertical wall 134 of the casing of the control device 10 so as to maintain the central alignment of the plunger member 126 during the operation of the valve assembly.

The annular operating edge 130 of plunger member 126 cooperates with the upper surface of snap disc or clicker member 136, the lower peripheral surface of which is held against a ring member 138 acting as a fulcrum for enhancing the snap action movement of the disc. The snap disc 136 may take any number of forms; for example, it may include an outer ring having a plurality of inwardly directed fingers. A cylindrical valve stem 140 is mounted within chamber 125 in cooperation with the central portion of snap disc 136 and includes a pair of spaced annular collars 142 and 144 and a cylindrical nub 146 which is formed upon the lower end of the valve stem 140. A conically tapered coil spring 148 is mounted between the undersurface of the flat portion of plunger member 126 and the upper side of collar 142 of valve stem 140 so as to exert a downwardly directed biasing force against the valve stem to take up the limited amount of lost motion coupling provided between the snap disc 136 and the valve stem 140 by the spacing of collars 142 and 144. A valve face 150 is carried upon the cylindrical nub 146 of the valve stem 140 and cooperates with a valve seat 152 formed in the casing of the control device 10 to control the flow of fuel through the bleed line 44 (FIG. 1) from an inlet passageway 154 of the valve assembly 100 to an outlet passageway 156 thereof.

In order to place the control system of FIG. 1 in operation, a supply of gas is fed to inlet 12 as by opening a shutoff cock (not shown). During the lighting of the pilot burner 32, the manual reset means on the holding device 38 is depressed whereby the valve member 40 is biased upwardly to an opened position; a bypass pilot flow of gas thereafter flows through the inlet 12, the opened valve member 40, the pilot passage 20, the filter cavity 22, the passage 24, the flow restrictor 26, the connecting member 28 and the conduit 30 to the pilot burner 32 where it is ignited as by a match. As soon as the thermocouple 34 is heated, the manual reset means may be released and the energized electromagnet holds the valve member 40 in its opened position.

A bleed flow of gas flows from the inlet 12 through the opened valve member 40, the rotatable shutoff cock 18, the fluid chamber 42, the bleed line passageway 44 and the flow restrictor 46, and thence through the two-way port 48, the passageway 50 and the port 52 into the main pressure chamber 54. Thus, the main flow valve 60 is closed against its seat 62 because the main diaphragm 56 is biased towards its closed position by the coil spring 58 whenever the pressure in chamber 54 and the inlet pressure on the upper surface of the diaphragm are equal. The equalization of the differential pressures occurs whenever the bleed flow passage 44 is closed downstream of the two-way port 48. For example, wherever the valve 66 is closed in response to a satisfied heat condition, the bleed flow is cut off and the main valve 60 is closed; such is the condition illustrated by the controlling positions of the components in FIG. 1.

Assuming now that the bulb 72 senses a demand for heat, the valve 66 is opened and the bleed flow proceeds from the flow restrictor 46 through the bleed passage 44, the opened valve 66, the open valve assembly 100, the regulating valve seat 74, the pressure-regulating chamber 76 and the bleed outlet 78 to the main outlet 14. During such flow through the bleed passage 44, the gas in the main pressure chamber 54 is bled off and inlet pressure on the upper surface of diaphragm 56 causes the main valve 60 to open whereby a main flow of gas to the main burner 16 is ignited by the flame at the pilot burner 32. It is now apparent that the valve 66 is cycled thermostatically to open and close the bleed flow line and effect corresponding opening and closing of the main flow line.

During the times when the thermostatically operated valve is opened, the bleed flow is regulated by the small pressure-regulating valve 84. The valve 84 is biased away from the valve seat 74 by the coil spring 86 and the pressure of the bleed flow acts on the undersurface of diaphragm 82 whereby the valve 84 seeks its predetermined regulating position. Regulation of the bleed flow effects a corresponding regulation of the pressure in the pressure chamber 54 so that the main valve 60 is provided with a regulatory movement.

At this same time, that is, when thermostatically operated valve 66 is opened, the high temperature valve assembly 100 permits a bleed line flow to continue from valve 66 to the regulating valve 84 and thence to the main outlet 14 when the ambient temperature sensed by bulb 104 is within the normally expected operating temperature range of the heating system. As will be more fully explained below, in the event that a malfunction of one or more of the system components causes the burner flame to be maintained for an excessive period of time so as to increase the temperature within the space heated by the burner above a preselected high limit, the expansible fluid within the bulb 104 becomes heated and produces an expansion of the bellows 108 which acts to close the valve assembly 100 and prevent the gas within the main pressure chamber 54 from being bled off. As a result, the main valve 60 closes against its valve seat 62 to block the main fuel flow to the burner 16 whereby the burner flame is extinguished.

Referring now to FIGS. 2 and 3, the valve assembly 100 of the control device 10 of FIG. 1 is shown in its normally opened position in FIG. 2 wherein the bellows 108 is retracted so that the spring member 112 assumes an extended position whereby the force exerted thereby upon the snap disc 136 is insufficient to close the valve 150. As illustrated, when the valve assembly 100 is open, the plunger member 126 is maintained in its maximum upward position whereupon the snap disc 136 exerts an upward force upon the undersurface of collar 142 of the valve stem 140. Thus, the valve face 150 is lifted away from its valve seat 152 so that an open flow passage is provided from inlet passageway 154 through chamber 125 to the outlet passageway 156.

As seen in FIG. 3, when the ambient temperature sensed by thermally responsive bulb 104 increases, the thermally expansible gas vapor within the bulb, capillary tube and bellows expands causing the lower end of the bellows 108 to move in a downward direction so as to compress spring member 112. As the bellows 108 expands and compresses the spring, the force exerted against thrust button 114 correspondingly increases and is transmitted through the diaphragm 118 to plunger member 126. This increased downward force is then transmitted through the plunger member 126 to the operating edge 130 thereof where it is applied to the upper surface of snap disc 136. At a predetermined excessive ambient temperature, the bellows 108 and spring member 112 will develop a sufficient force to cause the snap disc 136 to rapidly snap over center whereupon the undersurface of the disc 136 contacts the upper surface of collar 144 of the valve stem 140 to effect closure of the valve 150 against its seat 152. As a result, the bleed gas flow between the thermostatic on-off valve 66 and the pressure-sensing regulator valve 84 is interrupted to cut off the main fuel flow to the burner 16. In this manner, the main burner 16 will be automatically shut down any time the sensed ambient temperature reaches a high limit so as to effectively avoid a potentially harmful condition within the general proximity of the burner.

After the flame from main burner 16 has been extinguished, the high limit valve assembly 100 will remain closed until the ambient temperature has dropped by approximately 40° F. Thus, the valve assembly of the present invention has one operating point for effecting closure of the valve and a second, lower operating point for effecting opening of the valve, such differential being due to the combined effect of the snap action disc 136, the spring member 112 and the bellows 108. In other words, since movement of valve 150 with respect to its valve seat 152 is produced by the axial movement of plunger member 126 under the force applied by spring member 112 through thrust button 114, rather than under the direct force produced by the bellows 108, a relatively large movement of the bellows is necessary before the required force change caused by the expansion and contraction of the spring 112 has occurred to snap the disc member 136 over center.

The thermally responsive bulb 104, the capillary tube 102 and the bellows 108 of the high limit valve assembly 100 are charged when assembled by first evacuating all of the air contained therein and then filling the temperature-sensing assembly with a thermally expansible gas vapor, such as trichloroethylene, to a pressure which is less than atmospheric pressure. Thus, the bulb, tube and bellows assembly is maintained with its interior at a partial vacuum such that at any given ambient temperature, as sensed by the thermally responsive bulb 104, the axial length of the bellows will be less than if the bulb, tube and bellows assembly were filled to atmospheric pressure. For this reason, if either the bulb, the tube or the bellows is ruptured at any time during the operation of the control device 10, the interior of the thermal sensing assembly will be exposed to atmospheric pressure causing the bellows 108 to assume its normally longer axial dimension and effectuate closure of the valve assembly so as to cut off the bleed line passage from the main pressure chamber 54 of main valve 60. Thus, the valve assembly of the present invention is inherently fail-safe so as to preclude raw fuel leakage into the area adjacent the main burner 16 in the event that the thermal actuating assembly formed by bulb 104, tube 102 and bellows 108 becomes ruptured.

Thus, the present invention provides an independently operating high temperature safety valve which is both recycling and fail-safe for use in conjunction with a unitary fuel flow device at a savings of both cost and complexity.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. In a flow control and pressure-regulating system, the combination comprising a casing having inlet and outlet means, differential pressure-operated diaphragm valve means mounted in said casing between said inlet and outlet means and operatively movable between on-off positions and regulating positions, a bleed line in said casing controlling an operating pressure on said diaphragm valve means, a first on-off valve mounted in said bleed line and movable between on and off positions for controlling the operating pressure on said diaphragm valve means and moving the same between its on-off positions, thermostatic means operatively connected to said first on-off valve for actuating the same in response to ambient temperature variations, a pressure-regulating valve mounted in said bleed line for regulating the operating pressure on said diaphragm valve means to modulate the same, a second on-off valve mounted in said bleed line and movable between on and off positions for independently controlling the operating pressure on said diaphragm valve means and moving the same between its on-off positions, and hydraulically operated means including a snap-acting mechanism operatively connected to said second on-off valve for actuating the same in response to a predetermined excessive ambient temperature causing said diaphragm valve means to be moved to an off position in response to excessively high ambient temperatures independently of said first on-off valve and said pressure-regulating valve.

2. The invention as recited in claim 1 wherein said hydraulically operated means includes an enclosed chamber filled with a thermally expansible gas vapor to a pressure less than atmospheric pressure whereby a rupture of said chamber causes actuation of said second on-off valve to its off position.

3. The invention as recited in claim 2 wherein said enclosed chamber comprises a bellows, a capillary tube connected at one end with said bellows and a thermally responsive bulb connected with said bellows and said capillary tube at the other end of said capillary tube.

4. The invention as recited in claim 2 wherein said thermally expansible gas vapor comprises trichloroethylene.

5. In a flow control and pressure-regulating system, the combination comprising
a casing having inlet and outlet means,
differential pressure operated diaphragm valve means mounted in said casing between said inlet and outlet means and operatively movable between on-off positions and regulating positions,
a bleed line in said casing controlling an operating pressure on said diaphragm valve means,
a first on-off valve mounted in said bleed line and movable between on and off positions for controlling the operating pressure on said diaphragm valve means,
thermostatic means operatively connected to said first on-off valve for actuating the same in response to ambient temperature variations,
a pressure regulating valve mounted in said bleed line for regulating the operating pressure on said diaphragm valve means to modulate the same,
a second on-off valve mounted in said bleed line and movable between on and off positions for independently controlling the operating pressure on said diaphragm valve means, and
hydraulically operated means including a bellows and snap-acting coupling means operatively connected to said second on-off valve for actuating the same in response to a predetermined excessive ambient temperature whereby said diaphragm valve means is moved to an off position in response to excessively high ambient temperatures independently of said first on-off valve and said pressure regulating valve,
said snap acting coupling means including a spring member operatively connected with said bellows, a snap disc, and operator means mounted between said spring member and said snap disc whereby expansion of said bellows compresses said spring member for generating an operating force which is coupled through said operator means to said snap disc to move said second on-off valve to its closed position.

6. The invention as recited in claim 5 wherein said second on-off valve includes a valve seat disposed in said bleed line, a valve face and a valve stem carrying said valve face and operatively connected with said snap disc by lost motion coupling means.

7. The invention as recited in claim 6 wherein said lost motion coupling means includes first and second collars formed upon said valve stem at a preselected spacing, said snap disc being partially disposed between said first and second collars.

8. The invention as recited in claim 5 wherein said operator means includes a plunger member connected with said snap disc and a thrust button connected between said spring member and said plunger member whereby forces generated by said spring member and said bellows are transmitted to said snap disc.

9. In a fluid flow control system, the combination comprising
a casing having inlet and outlet means and main valve means for controlling a fluid flow therebetween,
diaphragm means for moving said main valve means and cooperating with a wall portion of said casing to define an operating pressure chamber,
bleed flow means having inlet and outlet portions communicating with said inlet and outlet means, respectively, of said casing and an intermediate portion communicating with said operating pressure chamber to cause actuation of said diaphragm means,
thermostatically controlled valve means in said outlet portion of said bleed flow means, and
hydraulically operated high limit means in said outlet portion of said bleed flow means having snap-acting valve means for shutting off fluid flow through said outlet portion of said bleed flow means in response to excessive ambient temperatures causing said diaphragm means to close said main valve means whenever the ambient temperature of the system becomes excessive regardless of the operative state of said thermostatically controlled valve means.

10. The invention as recited in claim 9 wherein said hydraulically operated high limit means includes an enclosed chamber filled with a thermally expansible fluid to a pressure less than atmospheric pressure.

11. The invention as recited in claim 10 wherein said thermally expansible fluid comprises trichloroethylene.

12. The invention as recited in claim 10 wherein said enclosed chamber comprises a bellows, a capillary tube and a thermally responsive bulb.

13. The invention as recited in claim 9 wherein said snap-acting valve means includes an operator member operatively coupled to a snap disc member by lost motion coupling means.

* * * * *

UNITED STATES PATENT OFFICE
CERTIFICATE OF CORRECTION

Patent No. 3,643,863              Dated February 22, 1972

Inventor(s)    John W. Wright

It is certified that error appears in the above-identified patent and that said Letters Patent are hereby corrected as shown below:

On the cover sheet the illustrative drawing should appear as shown below:

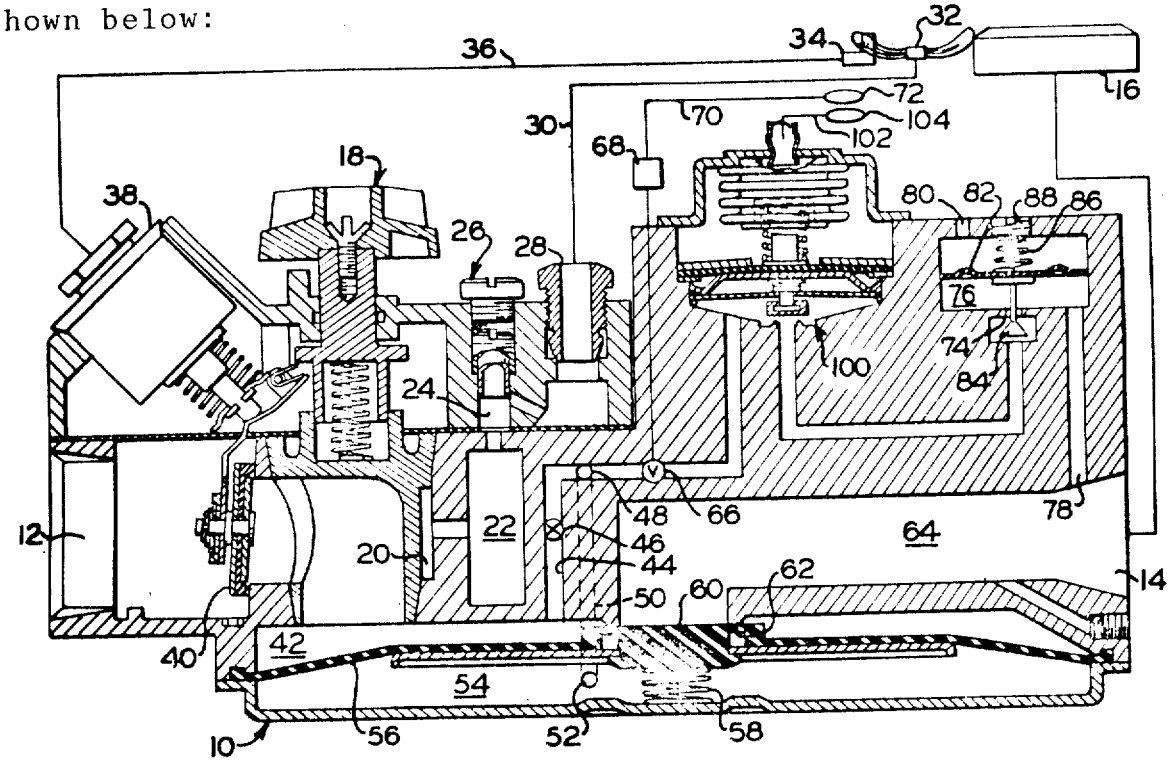

Signed and sealed this 19th day of September 1972.

(SEAL)
Attest:

EDWARD M. FLETCHER, JR.
Attesting Officer

ROBERT GOTTSCHALK
Commissioner of Patents